E. BLUNT, Jr.
Coffee Pot.
No. 93,587.
Patented Aug. 10, 1869.
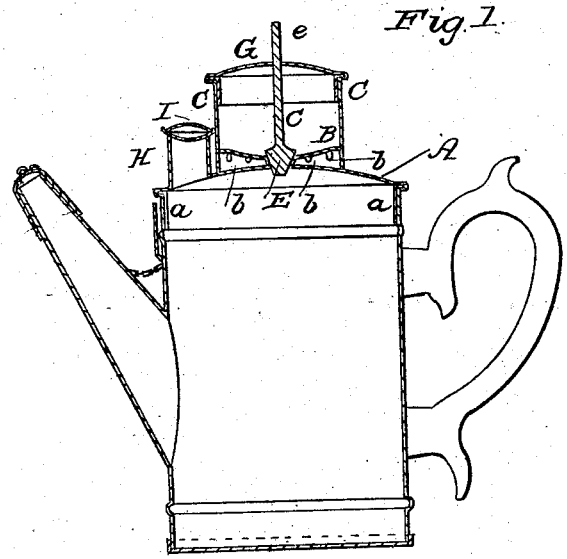
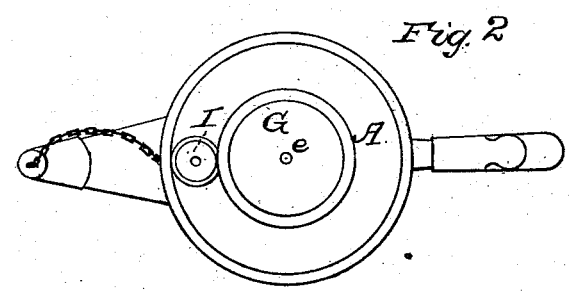

United States Patent Office.

E. BLUNT, JR., OF NEW YORK, N. Y.

Letters Patent No. 93,587, dated August 10, 1869.

IMPROVEMENT IN COFFEE-POTS.

The Schedule referred to in these Letters Patent and making part of the same.

*To all whom it may concern:*

Be it known that I, E. BLUNT, Jr., of the city and county of New York, State of New York, have invented certain new and useful Improvements in Coffee-Pots; and I do hereby declare that the following is a full and exact description thereof.

My invention relates to the top of the coffee-pot, and may be called an improvement in coffee-pot covers. In other words, I propose to make covers embracing all the novel parts, which may be sold as separate articles of trade, if preferred, and may be afterward fitted, by any manufacturer of coffee-pots, to their several styles.

The vessel, on which my invention is thus applied, may be used with good effect in preparing other decoctions than coffee, as will be readily understood.

I will first describe what I consider the best means of carrying out my invention, and will afterward designate the points which I believe to be new.

The accompanying drawings form a part of this specification.

Figure 1 is a central vertical section of the entire apparatus, and

Figure 2 is a plan view.

Similar letters of reference indicate like parts in both the drawings.

A is the main body of what would form an ordinary cover, and

*a* is the ordinary rim, which extends down near the edge thereof, to fit within the top of the coffee-pot.

The body of the coffee-pot, indicated in dotted lines in fig. 1, may be of any approved form and material.

B is a plate of tin, iron, or other suitable material, mounted a little above the ordinary cover A, and supported in place by the sides C of a cold-water vessel or reservoir, *c*, which is thereby formed.

The sides C, below the bottom B, are perforated, as indicated by *b*, allowing a circulation of the atmospheric air from the exterior between the plates A and B.

D is a conical tube, which joins the plates A and B. It is open at both ends, as represented, and is adapted to be tightly stopped by a conical plug, E, which may be of soft metal or other suitable material.

From the plug E, a wire, *e*, extends upward through the top cover G of the cold-water reservoir *c*.

When the coffee-pot is to be used, the coffee and a quantity of water being placed in the main body of the coffee-pot, cold water is poured into the reservoir *c*, and it is retained there until the coffee boils, after which the plug E is lifted, by means of the connecting-wire *e*, and the cold water is allowed to descend into the coffee-pot through the tube D, performing its well-known function of clarifying or settling the coffee.

H is a tube, fixed into the cover-plate A, outside the casing C. It is provided with a whistle at the upper end, as is indicated by I, and is open at both ends.

So long as the contents of the coffee-pot are below the boiling-temperature, my coffee-pot serves simply in its ordinary manner. When the coffee boils, the steam passes out through the tube H and whistle I, and produces a loud sound, which attracts the attention of the attendant, and thus aids to insure that the vessel will be removed from the fire, and the plug E lifted, about the proper time to avoid too much cooking the coffee.

In all previous attempts to introduce whistles or self-acting alarms for this purpose, the whistles have been placed in or connected to the cold-water vessel. They were either liable to become choked or to be greatly in the way.

In supplying either the water or the coffee, some was liable to be received in the whistles, and in case the coffee boiled violently, the whistles were again liable to be obstructed. In other words, the whistles, by forming a part of the cold-water reservoir, or of the means of communication between the same and the interior of the coffee-pot, introduced such objectionable features as to prevent their general adoption.

My improved arrangement allows a free and direct communication from the interior of the coffee-pot to the external atmosphere through the whistle, preserves the whistle from choking with water or with coffee, and allows both sides of the whistle to be easily inspected and cleaned when required.

I do not claim, broadly, a whistle, in connection with a coffee-pot, to give an alarm when the boiling commences, as such have been often proposed, and is also described in a patent to me, dated November 3, 1868; but all previous whistles on coffee-pots have been so arranged in reference to the other parts, that both sides are not accessible, and they are liable to become choked and deranged, while mine, by its improved arrangement, is, in a great degree, free from all liability to derangement.

Having now fully described my invention,

What I claim as new in coffee-pots, and desire to secure by Letters Patent, is—

The within-described new combination and arrangement, to wit, the cold-water vessel C, with the conical plug E *e*, for letting down its contents at will, and the whistle I, mounted outside on the independent tube H, all substantially as and for the purposes herein set forth.

E. BLUNT, Jr.

Witnesses:
 C. C. LIVINGS,
 HENRY M. COLLYER.